United States Patent
Nakanishi

(10) Patent No.: US 8,253,906 B2
(45) Date of Patent: Aug. 28, 2012

(54) LIQUID CRYSTAL DISPLAY DEVICE AND SUBSTRATE FOR LIQUID CRYSTAL DISPLAY DEVICE

(75) Inventor: Yohei Nakanishi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 421 days.

(21) Appl. No.: 12/524,084

(22) PCT Filed: Jan. 11, 2008

(86) PCT No.: PCT/JP2008/050254
§ 371 (c)(1),
(2), (4) Date: Jul. 22, 2009

(87) PCT Pub. No.: WO2008/117546
PCT Pub. Date: Oct. 2, 2008

(65) Prior Publication Data
US 2010/0097557 A1    Apr. 22, 2010

(30) Foreign Application Priority Data
Mar. 27, 2007 (JP) ................. 2007-082922

(51) Int. Cl.
*G02F 1/1343* (2006.01)
*G02F 1/1337* (2006.01)
(52) U.S. Cl. ........................... 349/139; 349/123
(58) Field of Classification Search .............. 349/141, 349/143, 123–128, 139
See application file for complete search history.

(56) References Cited

U.S. PATENT DOCUMENTS

| | | | |
|---|---|---|---|
| 5,953,084 A | 9/1999 | Shimada et al. | |
| 6,052,162 A | 4/2000 | Shimada et al. | |
| 6,097,452 A | 8/2000 | Shimada et al. | |
| 6,195,138 B1 | 2/2001 | Shimada et al. | |
| 7,880,822 B2 * | 2/2011 | Shimizu | 349/38 |
| 2001/0002857 A1 | 6/2001 | Shimada et al. | |
| 2002/0105613 A1 | 8/2002 | Yamakita et al. | |
| 2002/0145579 A1 | 10/2002 | Yamakita et al. | |
| 2002/0149551 A1 | 10/2002 | Yamakita et al. | |
| 2003/0122767 A1 | 7/2003 | Nakao et al. | |
| 2005/0062042 A1 | 3/2005 | Hayashi et al. | |
| 2007/0216840 A1 * | 9/2007 | Liao et al. | 349/141 |
| 2010/0259469 A1 * | 10/2010 | Shimizu et al. | 345/87 |

FOREIGN PATENT DOCUMENTS

| | | |
|---|---|---|
| JP | 2002-311456 | 10/2002 |
| JP | 2002-350902 | 12/2002 |
| JP | 2005-031680 | 2/2005 |

OTHER PUBLICATIONS

English International Search Report for PCT/JP2008/050254 mailed Feb. 19, 2008.

* cited by examiner

*Primary Examiner* — Dung T. Nguyen
(74) *Attorney, Agent, or Firm* — Nixon & Vanderhye P.C.

(57) ABSTRACT

A TFT substrate (110) of a liquid crystal display device(100) includes a common electrode (112) and a drain electrode (114) facing the common electrode (112) via an insulating layer (113) and provided with an opening (114*a*) for making an electric field generated between the common electrode (112) and the drain electrode (114) supplied into a liquid crystal layer (130). Since the opening (114*a*) for making an electric field supplied into the liquid crystal layer (130) is provided in the drain electrode (114) made from metal, the opening (114*a*) can be formed more finely than before. Thus, a liquid crystal display which can more surely control spray-to-bend transition can be attained.

9 Claims, 17 Drawing Sheets

LIQUID CRYSTAL DISPLAY DEVICE AND SUBSTRATE FOR LIQUID CRYSTAL DISPLAY DEVICE

This application is the U.S. national phase of International Application No. PCT/JP2008/050254 filed 11 Jan. 2008, which designated the U.S. and claims priority to Japan Application No. 2007-082922 filed 27 Mar. 2007, the entire contents of each of which are hereby incorporated by reference.

TECHNICAL FIELD

The present invention relates to an OCB mode liquid crystal display device that operates such that liquid crystal molecules that constitute a liquid crystal layer and are in splay alignment are changed from the splay alignment to bend alignment, and a substrate for use in such a liquid crystal display device.

BACKGROUND ART

Liquid crystal display devices are thin and lightweight, compared with CRTs (Cathode Ray Tube), and have an advantage that the liquid crystal display devices can operate with low operation voltage and low power consumption. For this reason, the liquid crystal display devices are employed in various electronic appliances such as a television (television receiver), a notebook-size PC (Personal Computer), a PDA (Personal Digital Assistance), and a cellular phone. These electronic appliances often carry out display of a moving image on a liquid crystal display device. For this reason, it is demanded for such a liquid crystal display device to have a high response speed in order that a moving image can be successfully displayed.

The liquid crystal display device having a high response speed that has been particularly considered noteworthy is an OCB (Optically self-Compensated Birefringence) mode liquid crystal display device. The OCB mode liquid crystal display device includes, for example: two glass substrates sandwiching liquid crystal molecules therebetween, which glass substrates have been subjected to an alignment process so that the liquid crystal molecules are aligned parallel in an identical direction; wave plates each provided on a surface of each of the glass substrate; and polarizers each further provided on the each of the substrates so as to establish crossed Nicols. The wave plates to be used may be negative wave plates whose main axis is hybrid-aligned.

FIG. 17 illustrates an operation mechanism of a conventional liquid crystal display device employing the OCB mode.

In the liquid crystal display device as illustrated in FIG. 17, alignment of liquid crystal molecules in a liquid crystal layer 13 is controlled by a voltage applied between (a) a counter substrate 12 provided on a side of an upper glass substrate 11, which side faces the liquid crystal layer 13 and (b) a pixel electrode 14 provided on a side of a bottom glass substrate 16, which side faces the liquid crystal layer 13. That is, the liquid crystal molecules constituting the liquid crystal layer 13 are maintained in splay alignment as shown in (a) of FIG. 17 while no voltage is being applied between the counter electrode 12 and the pixel electrode 14. While a voltage is being applied between the counter electrode 12 and the pixel electrode 14, the alignment of the liquid crystal molecules are changed from the splay alignment into bend alignment.

In the OCB mode, the following technique has been known as an effective technique for surely causing the liquid crystal molecules to be changed from the splay alignment into the bend alignment (hereinafter referred to as a "splay-to-bend transition"). That is, a local electric field is caused in the liquid crystal layer during the transition so as to form transition nuclei that facilitate the splay-to-bend transition. Such a technique for surely controlling the splay-to-bend transition by forming transition nuclei due to a local electric field is disclosed, for example, in Patent Citations 1 through 4.

Patent Citation 1 discloses a liquid crystal display device in which an opening is provided in a pixel electrode that is formed so as to overlap a storage capacitor electrode and transition nuclei are formed due to an electric field supplied from the opening into a liquid crystal layer. Patent Citation 2 also discloses a liquid crystal display device similar to the one disclosed in Patent Citation 1.

Patent Citation 3 discloses a technique for forming transition nuclei by a transverse electric field caused between a signal line and a pixel electrode. Further, Patent Citation 4 discloses a technique for more surely controlling the splay-to-bend transition by increasing an intensity of a transverse electric field by forming a wiring electrode between adjoining pixel electrodes.

Furthermore, Patent Citation 5 discloses another technique for surely controlling the splay-to-bend transition. That is, it is disclosed that an electrode for preventing an inverse transition is provided in an unobservable region so as to (i) prevent that molecules that are not changed from splay alignment into bend alignment remain during the splay-to-bend transition and (ii) prevent that liquid crystal molecules that have been changed into the bend alignment are inversely changed into the splay alignment.

Further, it has been known that formation of a pixel electrode on a plane base is effective for avoiding alignment failure of liquid crystal molecules. Patent Document 6 discloses a technique as follows: A pixel electrode is provided so as to overlap a respective of lines so that an aperture ratio is improved. Meanwhile, an interlayer insulating film is provided between the pixel electrode and the respective of lines so that the pixel electrode is provided on the interlayer insulating film as a base, thereby avoiding alignment failure of liquid crystal molecules.

Citation List

Patent Literature 1
Japanese Patent Application Publication, Tokukai, No. 2003-107531 A (Publication Date: Apr. 9, 2003)
Patent Literature 2
Japanese Patent Application Publication, Tokukai, No. 2005-31680 A (Publication Date: Feb. 3, 2005)
Patent Literature 3
Japanese Patent Application Publication, Tokukai, No. 2002-207206 A (Publication Date: Jul. 26, 2002)
Patent Literature 4
Japanese Patent Application Publication, Tokukai, No. 2002-350902 A (Publication Date: Dec. 4, 2002)
Patent Literature 5
Japanese Patent Application Publication, Tokukai, No. 2002-311456 A (Publication Date: Oct. 23, 2002)
Patent Literature 6
Japanese Patent Application Publication, Tokukaihei, No. 11-119261 A (Publication Date: Apr. 30, 1999)

SUMMARY OF INVENTION

In the conventional liquid crystal display devices disclosed in Patent Citation 1 and 2, the opening is provided in the pixel electrode so that an electric field caused between the pixel electrode and the storage capacitor electrode (common electrode) is supplied into the liquid crystal layer. This causes a problem that it is difficult to form a fine opening for causing the electric field to be supplied into the liquid crystal layer. This is because it is difficult to apply a microfabrication technique such as patterning to the pixel electrode that is made from a non-metal material such as ITO (Indium Tin Oxide).

A large opening decreases an intensity of the electric field supplied from the opening into the liquid crystal layer, thereby making it difficult to form a sufficient transition nucleus. This causes a problem that it is difficult to surely control a splay-to-bend transition.

Moreover, during a black display in which liquid crystal molecules should be bend-aligned, liquid crystal molecules may, in some cases, remain in splay alignment in a nucleus-forming region in which a transition nucleus is formed. This may cause light leakage in the nucleus-forming region. In order to prevent the light. leakage, structure for blocking backlight in the nucleus-forming region is required, but unfortunately, this causes an adverse effect that an aperture ratio decreases. In view of this, it is preferable that the nucleus-forming region be maintained as small as possible. However, since the pixel electrode made from a non-metal material such as ITO is not suitable for microfabrication as has been described above, it is difficult to maintain the nucleus-forming region to be small.

The present invention is accomplished in view of the above problem. An object of the present invention is to realize a liquid crystal display device (i) which allows easy microfabricating of an opening for causing an electric field to be supplied into a liquid crystal layer, thereby making it possible to more surely control a splay-to-bend transition, and (ii) which easily has a high aperture ratio.

In order to achieve the above object, a liquid crystal display device of the present invention includes: a first substrate; and a second substrate provided so as to face the first substrate via a liquid crystal layer, the liquid crystal layer being constituted by liquid crystal molecules that are in splay alignment and are changed from splay alignment into bent alignment by an electric field generated between the first and second substrates, the first substrate including a first electrode and a second electrode having an opening, the second electrode provided so as to face the first electrode via an insulating layer and the second electrode being made from metal.

In the arrangement, an electric field generated between the first and second electrodes is supplied from the opening of the second electrode into the liquid crystal layer, thereby successfully forming, by thus supplied electric field, a transition nucleus for causing splay-to-bend transition. As a result, a potential difference between the first and second substrates can more surely causes liquid crystal molecules constituting the liquid crystal layer to be changed from splay alignment into bend alignment.

Besides, with the arrangement, since the second electrode is made from metal, it is advantageously possible to easily form a fine opening for causing an electric field to be supplied into the liquid crystal layer. Specifically, it is possible to more increase an intensity of an electric field supplied into the liquid crystal layer than before, thereby resulting in that it is advantageously possible to more surely control the splay-to-bend transition than before. Further, since the opening for causing an electric field to be supplied into the liquid crystal layer can be formed smaller than in a conventional technique, a nucleus-forming region in which light from a backlight should be blocked is reduced in size. This makes it possible to advantageously increase an aperture ratio.

In the liquid crystal display device of the present invention, it is preferable that the first substrate include a pixel electrode on its surface that faces the liquid crystal layer, the pixel electrode have an opening in a region covering the opening of the second electrode, and an edge of the pixel electrode, surrounding the opening of the pixel electrode, be connected to the second electrode.

With the arrangement, it is possible to generate an electric field between the first and second substrates by a voltage applied to the pixel electrode.

In addition, since the pixel electrode has an opening in a region covering the opening of the second electrode, an electric field supplied from the opening of the second electrode is not blocked by the pixel electrode. That is, the arrangement can cause the electric field to be supplied from the opening of the second electrode into the liquid crystal layer, thereby further obtaining an effect that a transition nucleus for causing the splay-to-bend transition can be formed by thus supplied electric field.

In the liquid crystal display device of the present invention, it is preferable that the second electrode be an end part of a drain electrode of a thin film transistor via which drain electrode a voltage is applied to the pixel electrode, the end part being provided so as to extend above the first electrode.

Since the drain electrode is made from metal, the arrangement makes it possible to form a fine opening for causing an electric field to be supplied into the liquid crystal layer, thereby more increasing an intensity of the electric field supplied into the liquid crystal layer than a conventional technique.

It is preferable that the first electrode be a common electrode provided to cut across the pixel electrode.

With the arrangement, it is advantageously possible to stabilize a pixel potential by an auxiliary capacitance generated between the second electrode and the common electrode.

In the liquid crystal display device of the present invention, it is preferable that the second electrode have a slit in a region covered with the pixel electrode and the pixel electrode have a slit in a region covering the slit of the second electrode.

The arrangement allows an electric field supplied from the slit of the second electrode to reach the liquid crystal layer via the slit of the pixel electrode. As a result, a transition nucleus can be formed due to the electric field supplied via the slit of the pixel electrode, in addition to the electric field supplied from the opening of the second electrode. This forms a larger transition nucleus, thereby resulting in that it is possible to further obtain an advantageous effect that the splay-to-bend transition can be more surely caused.

In the liquid crystal display device of the present invention, it is preferable that the first substrate further include a planarizing layer having an opening in a region covering the opening of the second electrode and the pixel electrode be provided on the planarizing layer.

With the arrangement, since the planarizing layer ensures a distance between the pixel electrode and wiring lines provided in the first substrate, it is advantageously possible to reduce a capacitance generated between the wiring lines and the pixel electrode, thereby successfully suppressing generation of crosstalk. Further, since the pixel electrode is provided on the planarizing layer, the pixel electrode hardly becomes uneven, with the result in that uneven alignment of liquid crystal molecules, caused due to unevenness of the pixel electrode, can be successfully suppressed.

In the liquid crystal display device of the present invention, it is preferable that a width of the pixel electrode be expanded so that the pixel electrode and a data bus line provided on the first substrate overlaps each other.

The arrangement attains an advantageous effect that an aperture ratio increases.

In the liquid crystal display device of the present invention, it is preferable that a width of at least one of the first and second electrodes be expanded so that the at least one of the first and second electrodes covers over the opening of the planarizing layer.

The liquid crystal layer in the opening of the planarizing layer has retardation different from that in a normal region. Therefore, the retardation in the opening of the planarizing layer cannot be compensated by an optical compensation film. This may cause leakage of light emitted from a backlight as a light source during a black display.

However, with the arrangement, since the light emitted from the backlight is blocked by at least any one of the first and second electrodes and cannot enter the opening of the planarizing layer, it is possible to prevent light leakage, which may be caused during the black display. Consequently, it is advantageously possible to solve the problem of a decrease in contrast caused due to an increase in black luminance.

In the liquid crystal display device of the present invention, it is preferable that widths of the first and second electrodes be expanded so that the first and second electrodes cover over the opening of the planarizing layer.

With the arrangement, it is advantageously possible to increase an auxiliary capacitance between the first and second electrodes.

The present invention also includes the first substrate in the liquid crystal display device, that is, a substrate for use in a liquid crystal display device in which liquid crystal molecules that constitute a liquid crystal layer and are in splay alignment are changed from the splay alignment into bend alignment, the substrate including: a first electrode; and a second electrode having an opening, the second electrode being provided so as to face the first electrode via an insulating layer, and the second electrode being made from metal.

Additional objects, features, and strengths of the present invention will be made clear by the description below. Further, the advantages of the present invention will be evident from the following explanation in reference to the drawings.

BRIEF DESCRIPTION OF DRAWINGS

FIG. 1 is a cross-sectional view illustrating a liquid crystal display device according to a first embodiment of the present invention.

FIG. 2 is a plane view illustrating a TFT substrate of the liquid crystal display device according to the first embodiment of the present invention.

FIG. 3 is a plane view illustrating a TFT substrate of a liquid crystal display device according to a first modified example of the first embodiment of the present invention.

FIG. 4 is a plane view illustrating a TFT substrate of a liquid crystal display device according to a second modified example of the first embodiment of the present invention.

FIG. 5 is a cross-sectional view illustrating the liquid crystal display device according to the second modified example of the first embodiment of the present invention.

FIG. 6 is a plane view illustrating a TFT substrate of a liquid crystal display device according to a third modified example of the first embodiment of the present invention.

FIG. 7 is a cross-sectional view illustrating a liquid crystal display device according to an embodiment of the present invention.

FIG. 8 is a plane view illustrating a TFT substrate of the liquid crystal display device of the present invention.

FIG. 9 is a cross-sectional view illustrating a liquid crystal display device according to a second embodiment of the present invention.

FIG. 10 is a plane view illustrating a TFT substrate of the liquid crystal display device according to the second embodiment of the present invention.

FIG. 11 is a plane view illustrating a TFT substrate of a liquid crystal display device according to a first modified example of the second embodiment of the present invention.

FIG. 12 is a cross-sectional view illustrating the liquid crystal display device according to the first modified example of the second embodiment of the present invention.

FIG. 13 is a plane view illustrating a TFT substrate of a liquid crystal display device according to a second modified example of the second embodiment of the present invention.

FIG. 14 is a cross-sectional view illustrating the liquid crystal display device according to the second modified example of the second embodiment of the present invention.

FIG. 15 is a plane view illustrating a TFT substrate of a liquid crystal display device according to a third modified example of the second embodiment of the present invention.

FIG. 16 is a cross-sectional view illustrating the liquid crystal display device according to the third modified example of the second embodiment of the present invention.

FIG. 17 illustrates a conventional technique, illustrating an operational mechanism of an OCB mode liquid crystal display device. (a) of FIG. 17 illustrates a splay alignment state and (b) of FIG. 17 illustrates a bend alignment state.

REFERENCE SIGNS LIST 100, 300: Liquid Crystal Display Device
110, 310: TFT Substrate (First Substrate)
120, 320: Counter Substrate (Second Substrate)
130, 330: Liquid Crystal Layer
111, 311: Glass Substrate
112, 312: Common Electrode (First Electrode)
113, 313: Insulating Layer
114, 314: Drain Electrode (Second Electrode)
115, 315: Insulating Layer (Planarizing Layer)
116, 316: Pixel Electrode
117, 317: Gate Bus Line
118, 318: Data Bus Line
119, 319: TFT (Thin Film Transistor)

DESCRIPTION OF EMBODIMENTS

Embodiment 1

A liquid crystal display device 100 according to a first embodiment of the present invention is described below with reference to FIGS. 1 through 6.

Figure 1:
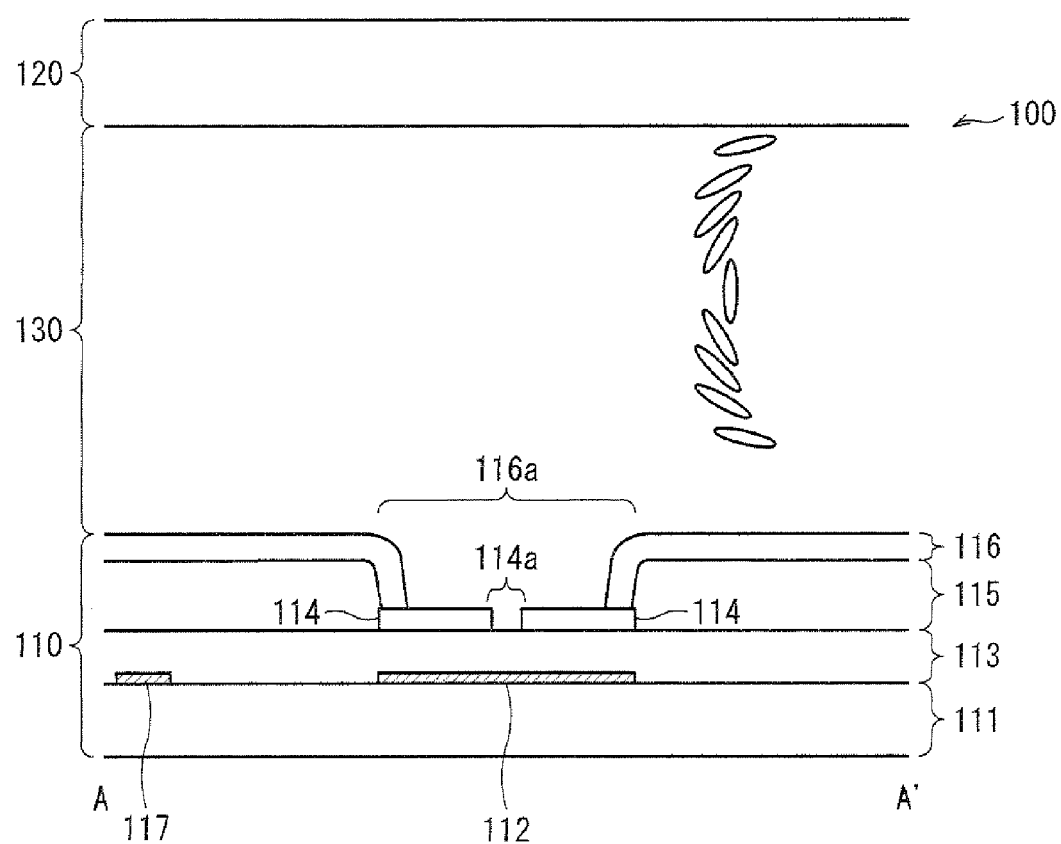
FIG. 1

FIG. 1 is a cross-sectional view of the liquid crystal display device 100 according to the present embodiment, schematically illustrating an arrangement of essential part of the liquid crystal display device 100.

As illustrated in FIG. 1, the liquid crystal display device 100 is, in a schematic manner, an OCB mode liquid crystal display device including: a TFT substrate 110 (a first substrate, a substrate for a liquid crystal display device); a counter substrate 120 (a second substrate) provided so as to face the TFT substrate 110; and a liquid crystal layer 130 sandwiched between the TFT substrate 110 and the counter substrate 120.

Horizontal alignment films (not shown) are provided (i) on an interface between the TFT substrate 110 and the liquid crystal layer 130 and (ii) on an interface between the counter substrate 120 and the liquid crystal layer 130, respectively. This causes liquid crystal molecules constituting the liquid crystal layer 130 to be maintained in splay alignment. A pixel electrode 116 is provided on a surface of the TFT substrate 110, which surface faces the liquid crystal layer 130, and a counter electrode (not shown) is provided on a surface of the counter substrate 120, which surface faces the liquid crystal layer 130. While a potential difference is being applied between the pixel electrode 116 and the counter electrode, the alignment of the liquid crystal molecules constituting the liquid crystal layer 130 is changed into bend alignment.

The TFT substrate 110 includes: a glass substrate 111; a common electrode 112 (a first electrode) functioning as an auxiliary capacitance electrode (a Cs electrode), provided on the glass substrate 111; a drain electrode 114 (a second electrode) having an opening 114a, provided so as to face, via an insulating layer 113, a surface of the common electrode 112 which surface faces the liquid crystal layer 130; and an insulating layer 115 provided on the insulating layer 113 so as to surround the opening 114a of the drain electrode 114. The aforementioned pixel electrode 116 is provided on the insulating layer 115.

Since the opening 114a is provided in the drain electrode 114, an electric field generated between the common electrode 112 and the drain electrode 114 is supplied into the liquid crystal layer 130. In other words, an equipotential line in the liquid crystal layer 130 curves and an electric field in the vicinity of the opening 114a has a component parallel to the substrate. The electric field supplied from the opening 114a into the liquid crystal layer 130 causes liquid crystal molecules in the vicinity of the opening 114a to be changed into the bend alignment, thereby forming a transition nucleus. The transition nucleus facilitates a splay-to-bend transition. That is, a region in which the liquid crystal molecules have been changed into the bend alignment spreads all over a pixel region from the transition nucleus.

Figure 2:
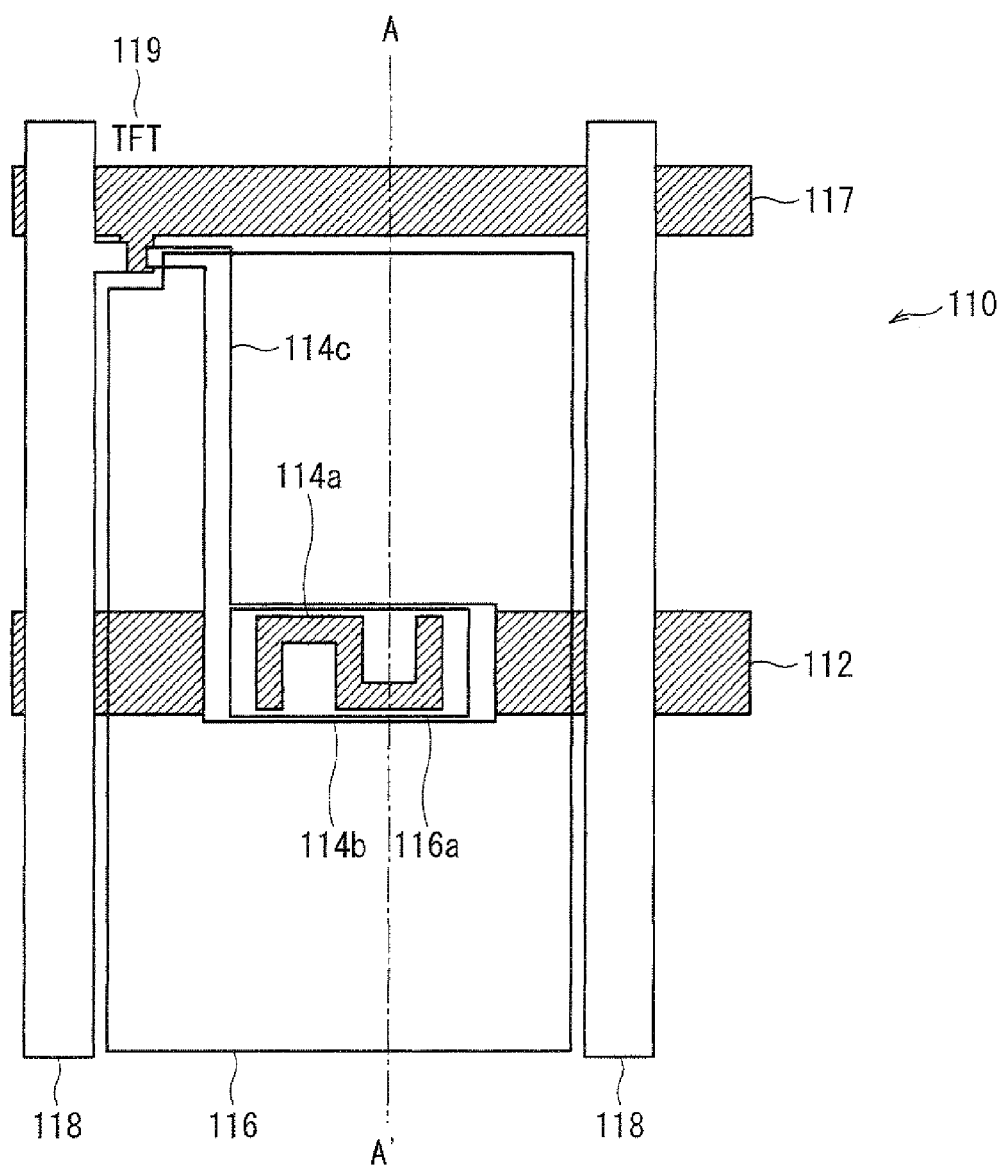
FIG. 2

FIG. 2 is a top view of the TFT substrate 110 of the liquid crystal display device 100, schematically illustrating an arrangement of essential part of the TFT substrate 110. The following deals with the TFT substrate 110 in more details with reference to FIG. 2. The cross-sectional view illustrated in FIG. 1 is taken along line A-A' in the top view of FIG. 2.

The TFT 110 includes, as has been already described: the glass substrate 111 (not shown); the common electrode 112; the insulating layer 113 (not shown); the insulating layer 115 (not shown); and the pixel electrode 116. In addition, the TFT substrate 110 further includes: a gate bus line 117; a data bus line 118; and a TFT (Thin Film Transistor) 119, as illustrated in FIG. 2.

The gate bus line 117 and the data bus line 118 are provided on the glass substrate 111 so as to be perpendicular to each other. The TFT 119 is provided at an intersection of the gate bus line 117 and the data bus line 118. A gate electrode is connected to the gate bus line 117, and a source electrode is connected to the data bus line 118.

The common electrode 112 is provided in the same layer as the gate bus line 117 (see FIG. 1) such that the common electrode 112 is parallel to the gate bus line 117 and cuts across a center of the pixel electrode 116. Each of the gate bus line 117, the data bus line 118, and the common electrode 112 is connected to a driving circuit so that an arbitrary potential from an external section can be independently applied to each of them.

The drain electrode 114 extends from the TFT 119 provided in a corner of a pixel region comparted by the gate bus line 117 and the data bus line 118, to a center of the pixel region. Specifically, a rectangular end part 114b of the drain electrode 114 is arranged so as to face the common electrode 112. An auxiliary capacitance generated between the end part 114b of the drain electrode 114 and the common electrode 112 stabilizes a pixel potential. An extending part 114c of the drain electrode 114 that connects the TFT 119 to the end part 114b is formed in a thin line shape so as not to decrease the aperture ratio.

The opening 114a that causes an electric field to be supplied into the liquid crystal layer 130 is provided in the end part 114b of the drain electrode 114 made from metal. The pixel electrode 116 made from a transparent non-metal material such as ITO is not suitable for a microfabricated structure of less than 5 μm because a pattern is easily damaged in the pixel electrode 116 made from such a material. In contrast, the drain electrode 114 made from metal can be easily formed in a microfabricated structure of about 5 μm. This allows the opening 114a to have a slit width of about 5 μm, thereby resulting in that a size (width) of a nucleus-forming region is reduced to about half in comparison with a conventional structure having a slit width of about 10 μm. This makes it possible to improve the aperture ratio by about 5%, for example, in a 15-inch XGA.

The opening 114a of the drain electrode 114 shown in FIG. 2 is arranged such that rectangular slits are combined substantially in an "S" shape. This assures a sufficient slit area while the slit width is kept small. The opening 114a may be formed in any shape provided that an electric field generated between the drain electrode 114 and the common electrode 112 can be supplied from the opening 114a into the liquid crystal layer 130. The opening 114a may be, for example, a single rectangular slit that is more easily formed.

As shown in FIG. 2, the pixel electrode 116 has a rectangular opening 116a provided in a region covering the opening 114a of the drain electrode 114. Further, an edge of the pixel electrode 116, surrounding the opening 116a of the pixel electrode 116, reaches the end part 114b of the drain electrode 114 along a sidewall of the insulating layer 115 (see FIG. 1). The arrangement prevents an electric field supplied from the opening 114a of the drain electrode 114 from being blocked by the pixel electrode 116, and allows the electric field to reach the liquid crystal layer 130.

In the liquid crystal display device 100, an opening for causing an electric field to be supplied into the liquid crystal layer 130 is provided in the drain electrode 114. However, the opening is not limited to be provided in the drain electrode 114. For example, in a case where a common electrode and a drain electrode are provided so as to be positioned in an adverse manner to the above, like a top gate TFT, the opening may be provided not in the drain electrode, but in the common electrode provided closer to a liquid crystal layer than the drain electrode.

MODIFIED EXAMPLE 1

In the liquid crystal display device 100, the opening 114a of the drain electrode 114 is provided in a region that is not covered with the pixel electrode 116 (see FIG. 2). However, the liquid crystal display device 100 is not limited to this. More specifically, the opening 114a of the drain electrode 114 may be extended to a region covered with the pixel electrode 116. In this case, it is preferable that the opening 116a of the pixel electrode 116 be also extended in conformity with the extending of the opening 114a.

Figure 3:
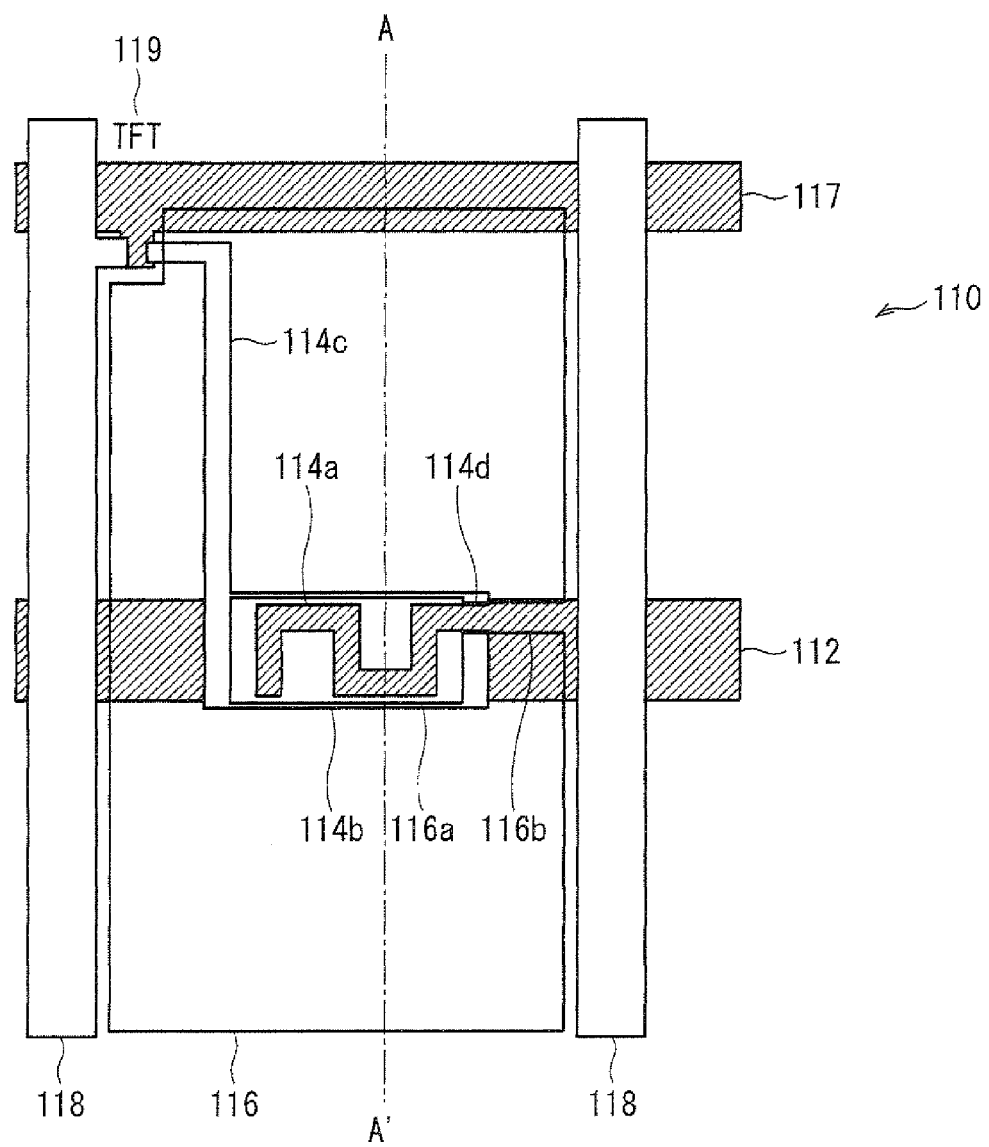
FIG. 3

FIG. 3 is a plane view illustrating a TFT substrate 110 of a liquid crystal display device 100 in which an opening 114a of a drain electrode 114 is extended to a region covered with a pixel electrode 116. As illustrated in FIG. 3, an end part 114b of the drain electrode 114 has a slit 114d that is continued to the opening 114a, and the pixel electrode 116 has a slit 116b that is continued to an opening 116a.

The slit 114d of the drain electrode 114 and the slit 116b of the pixel electrode 116 have the substantially same slit width and are provided so as to overlap each other, as illustrated in FIG. 3. The arrangement causes an electric field supplied from the slit 114d of the drain electrode 114 to reach a liquid crystal layer 130 via the slit 116b of the pixel electrode 116. This allows forming of a transition nucleus not only by the electric field supplied from the opening section 114a of the drain electrode 114, but also by the electric field supplied from the slit 116b of the pixel electrode 116. As a result, a larger transition nucleus can be formed, thereby more surely carrying out a splay-to-bend transition.

MODIFIED EXAMPLE 2

In the liquid crystal display device 100, the pixel electrode 116 is provided so that the pixel electrode 116 and the data bus line 118 do not overlap each other. This is because a defective display such as a crosstalk caused due to an electrostatic capacitance generated between the pixel electrode 116 and the data bus line 118 is to be prevented.

However, if the pixel electrode 116 is sufficiently distanced from the data bus line 118, the electrostatic capacitance generated therebetween is reduced. In this case, a width of the pixel electrode 116 can be expanded so that the pixel electrode 116 and the data bus line 118 overlap each other, thereby improving the aperture ratio. For this purpose, the insulating layer (the planarizing layer) 115, which is provided as a lower layer of the pixel electrode 116, may be provided so as to have an increased thickness so that the electrostatic capacitance generated between the pixel electrode 116 and the data bus line 118 is sufficiently reduced.

Figure 4:
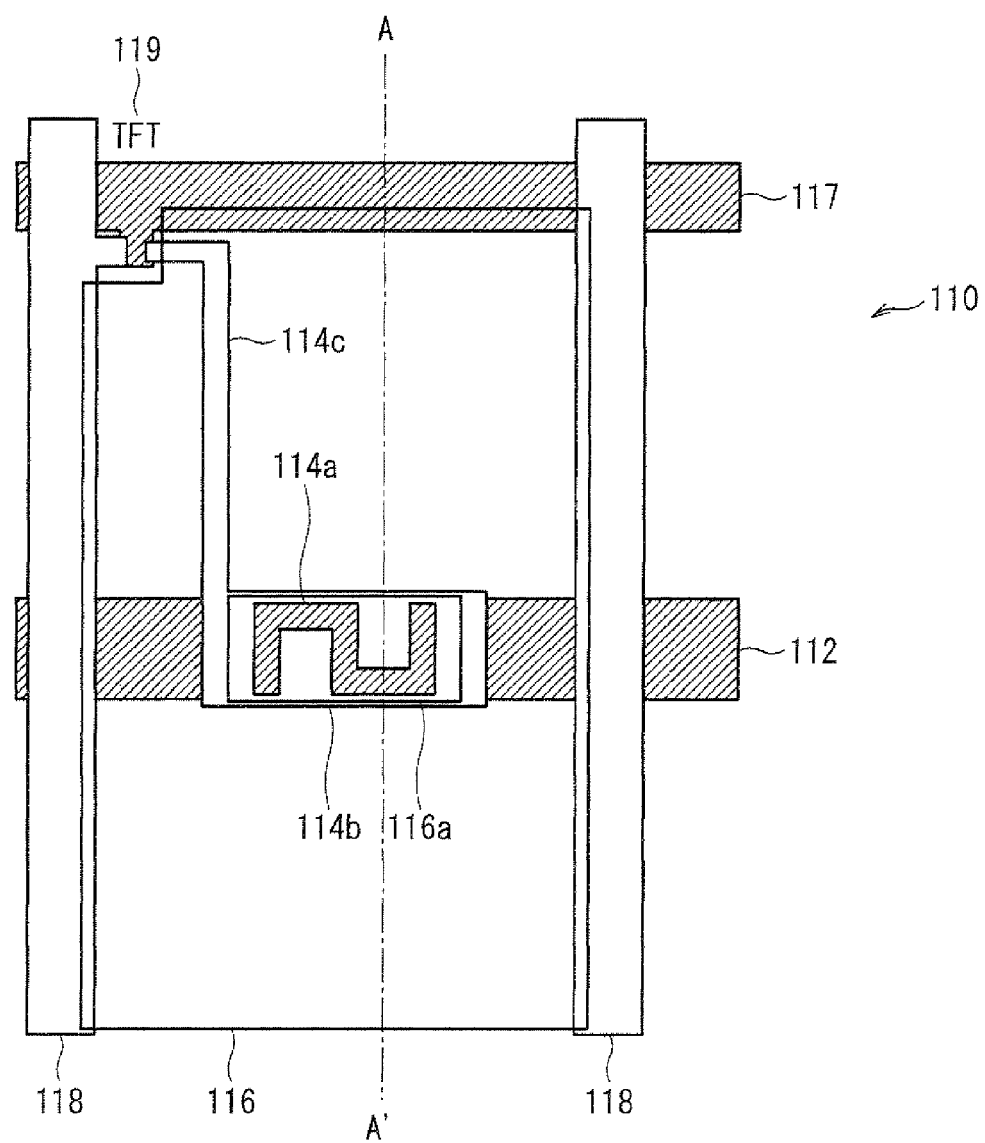
FIG. 4

FIG. 4 is a plane view illustrating a TFT substrate 10 of a liquid crystal display device 100 in which a width of a pixel electrode 116 is expanded so that the pixel electrode 116 and a data bus line 118 overlap each other. Further, FIG. 5 is a cross-sectional view illustrating the liquid crystal display device 100 in which an insulating layer 115 is sufficiently increased in thickness so that an electrostatic capacitance generated between the pixel electrode 116 and the data bus line 118 does not affect a display quality.

In a case where an insulating layer is increased in thickness and a pixel electrode provided on the insulating layer has, like in a conventional technique, an opening for forming a transition nucleus, it is difficult to obtain a distortion of an electric field that is sufficient to form the transition nucleus in a liquid crystal layer. In contrast, the liquid crystal display device 100 employs, as illustrated in FIG. 5, a structure in which an opening 114a provided in a drain electrode 114 is directly exposed to a liquid crystal layer 130 without being covered with the pixel electrode 116. This makes it possible to obtain a distortion of an electric field that is sufficient to form a transition nucleus in the liquid crystal layer 130.

MODIFIED EXAMPLE 3

Figure 5:
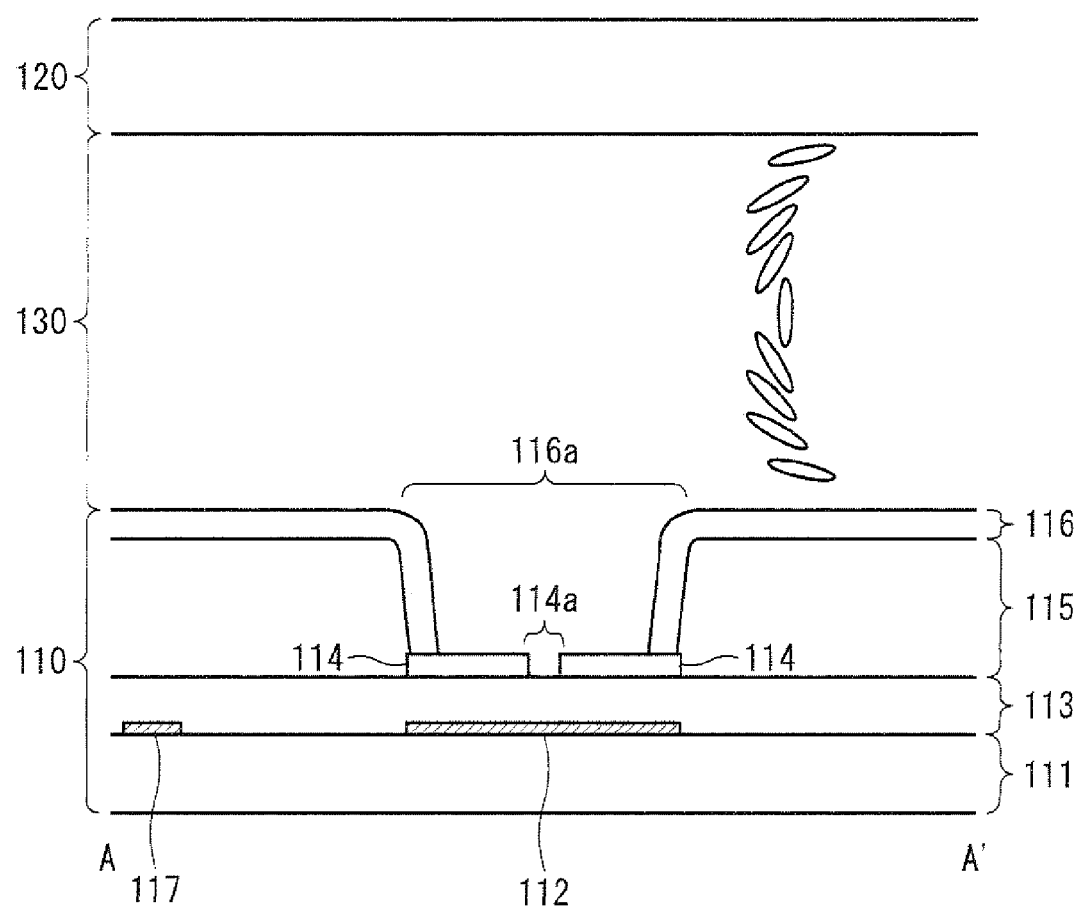
FIG. 5

The liquid crystal display device 100 shown in FIGS. 4 and 5, in which the insulating layer 115 is increased in thickness, may employ a structure in which the opening 114a of the drain electrode 114 is extended to a region covered with the pixel electrode 116.

Figure 6:
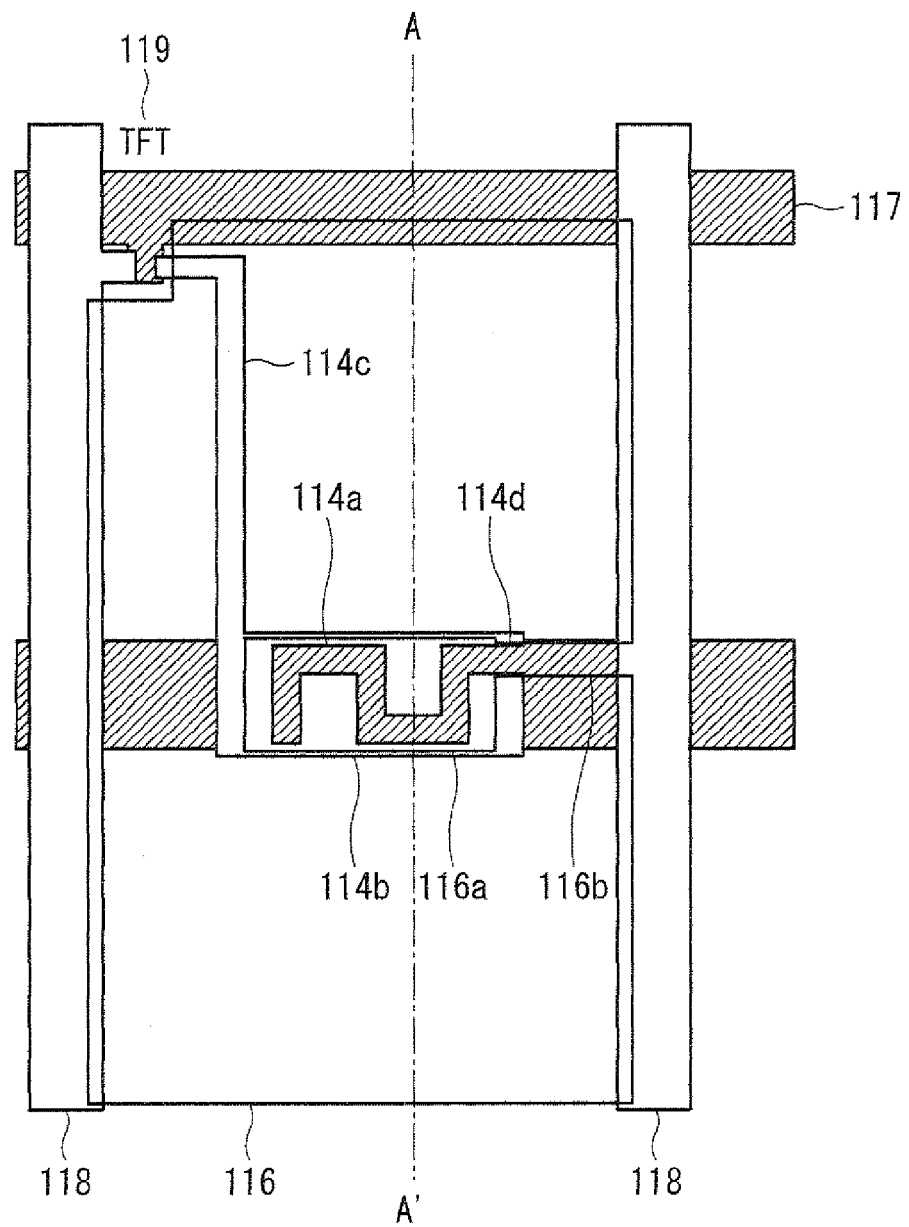
FIG. 6

FIG. 6 is a plane view illustrating a TFT substrate 110 of a liquid crystal display device 100 in which an insulating layer 115 is sufficiently increased in thickness and an opening 114a of a drain electrode 114 is extended to a region covered with a pixel electrode 116. As illustrated in FIG. 6, an end part 114b of the drain electrode 114 has a slit 114d that is continued to the opening 114a, and the pixel electrode 116 has a slit 116b that is continued to an opening 116a. In this case, too, the slit 114d of the drain electrode 114 and the slit 116b of the pixel electrode 116 have the substantially same slit width, and are provided so as to overlap each other. Herewith, an electric field supplied from the slit 114d of the drain electrode 114 can reach a liquid crystal layer 130 via the slit 116b of the pixel electrode 116.

Embodiment 2

Figure 7:
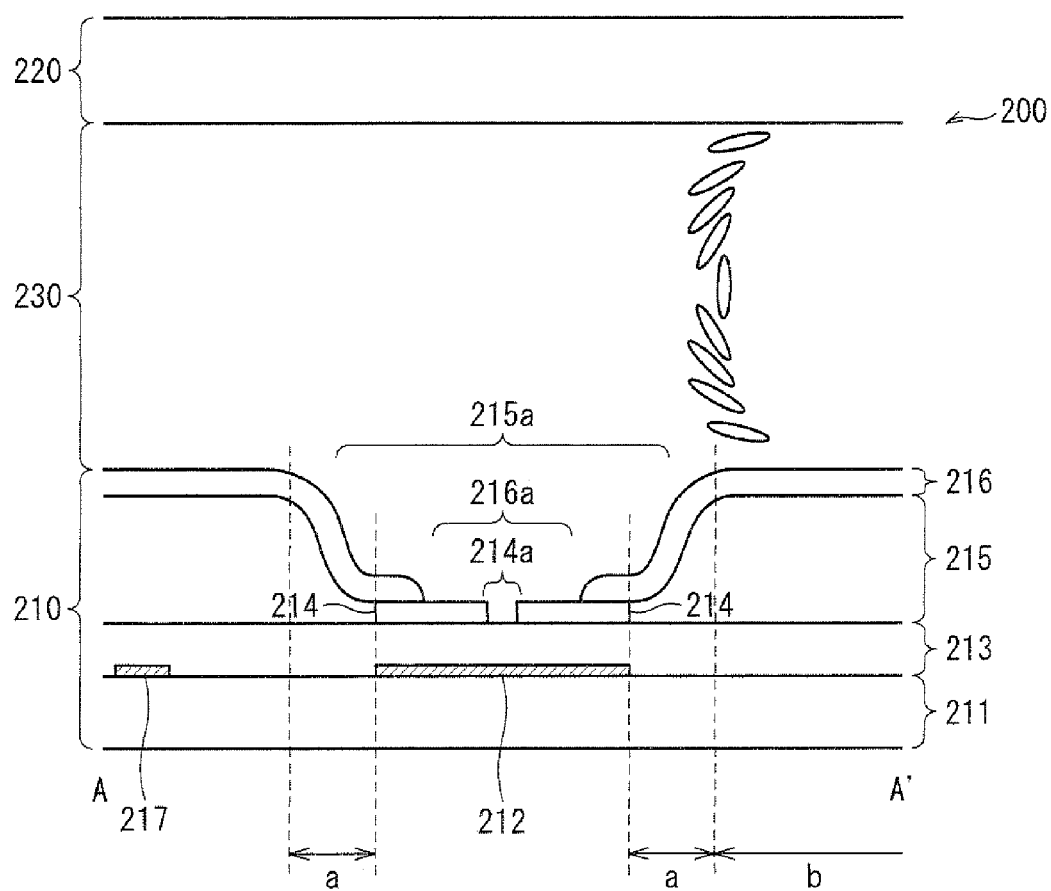
FIG. 7
Figure 8:
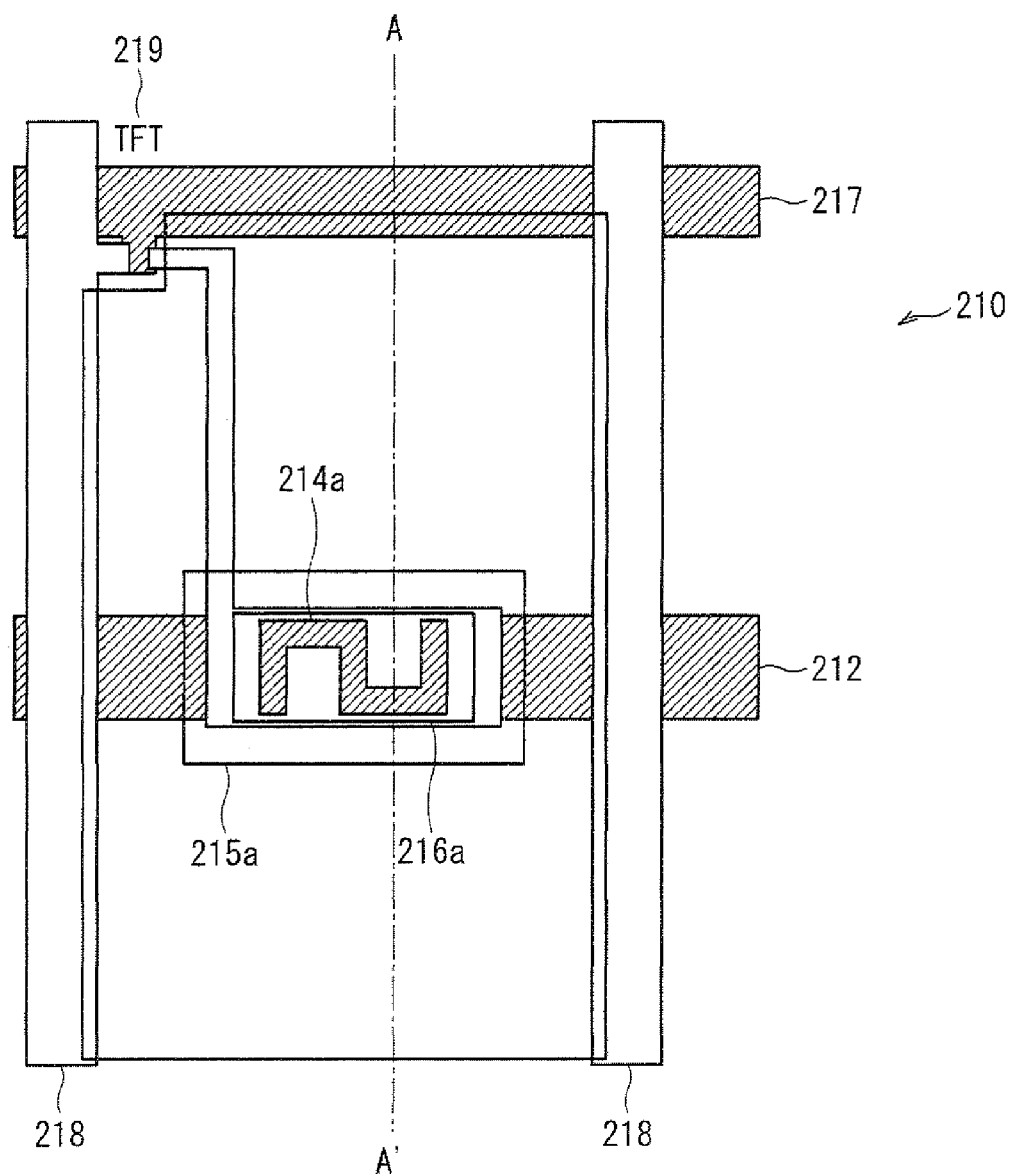
FIG. 8

Firstly explained is a problem to be solved by a liquid crystal display device according to the present embodiment, with reference to FIGS. 7 and 8.

FIG. 7 is a cross-sectional view illustrating an arrangement of a liquid crystal display device 200 obtained by applying the present invention to a liquid crystal display device in which a pixel electrode is provided on a planarizing layer. FIG. 8 is a plane view illustrating an arrangement of a TFT substrate of the liquid crystal display device 200 illustrated in FIG. 7. The cross-sectional view illustrated in FIG. 7 is taken along line A-A' in FIG. 8.

As illustrated in FIG. 7, the liquid crystal display device 200 includes, in a schematic manner: a TFT substrate 210; a counter substrate 220 provided so as to face the TFT substrate 210; and a liquid crystal layer 230 sandwiched between the TFT substrate 210 and the counter substrate 220. The TFT substrate 210 includes: a glass substrate 211; a common electrode 212 provided on the glass substrate 211; a drain electrode 214 having an opening 214a, provided so as to face, via an insulating layer 213, a side of the common electrode 212 which side faces the liquid crystal layer 230; and a planarizing layer 215 provided on the insulating layer 213 so as to surround the opening 214a of the drain electrode 214.

An opening 215a is provided in the planarizing layer 215 so that the opening 214a of the drain electrode 214 is exposed to the liquid crystal layer 230. The pixel electrode 216 is arranged so as to reach the drain electrode 214 along a sloping sidewall of the opening 215a of the planarizing layer 215.

In the arrangement illustrated in FIGS. 7 and 8, a transition nucleus is formed in the opening 215a of the planarizing layer 215 due to an electric field supplied from the opening of the drain electrode 214. This allows liquid crystal molecules constituting the liquid crystal layer 230 to be surely changed from splay alignment to bend alignment. However, the following problem arises at the same time.

A black display in the OCB mode is carried out such that retardation of an optical compensation film compensates retardation of a liquid crystal layer. Since the opening 215a has a cell thickness different from that of a normal region b and a boundary of the opening 215a has a sloping surface, liquid crystal molecules in the opening 215a are aligned differently from those in the normal region b. That is, retardation of the liquid crystal layer in the opening 215a is different from that in the normal region b, with the result in that the retardation in the opening 215a cannot be compensated by the optical compensation film. This causes light leakage.

By referring to FIGS. 9 through 15, the following explains about a liquid crystal display device 300 according to the present invention that is modified so as to solve the above problem.

Figure 9:
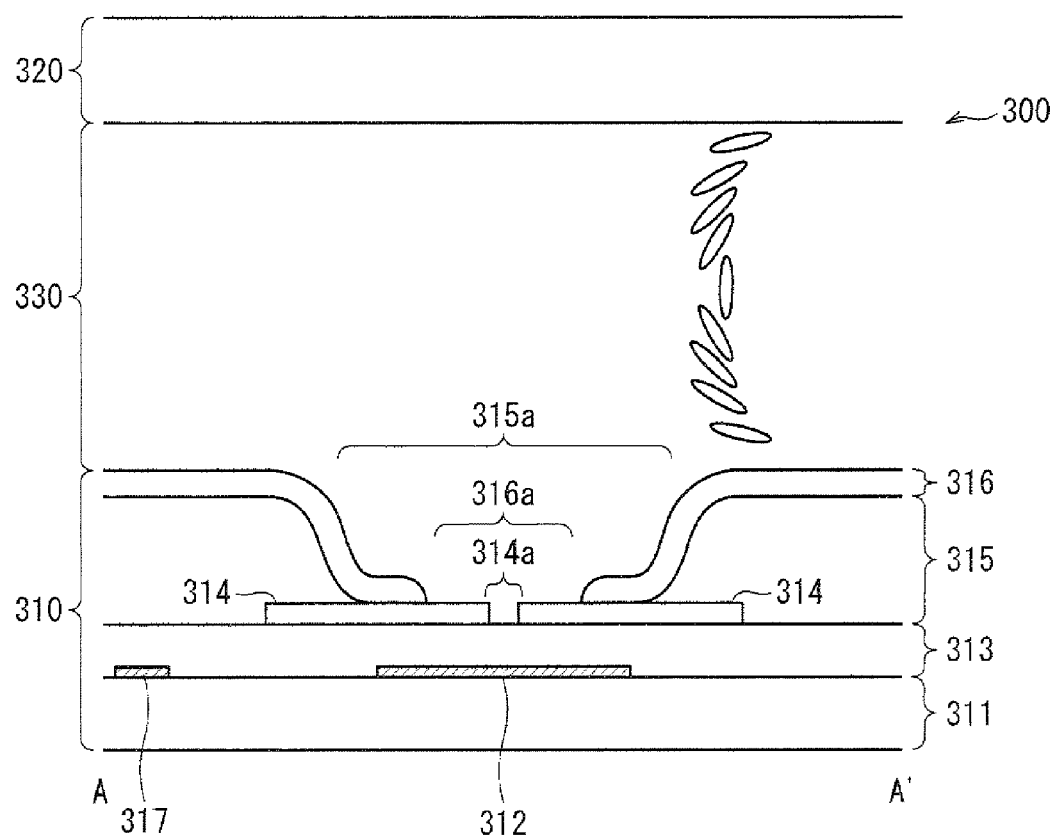
FIG. 9

FIG. 9 is a cross-sectional view of the liquid crystal display device 300 according to the present embodiment, schematically illustrating an arrangement of essential part of the liquid crystal display device 300.

As illustrated in FIG. 9, the liquid crystal display device 300 is an OCB mode liquid crystal device including, in a schematic manner: a TFT substrate 310 (a first substrate, a substrate for a liquid crystal display device); a counter substrate 320 (a second substrate) provided so as to face the TFT substrate 310; a liquid crystal layer 330 sandwiched between the TFT substrate 310 and the counter substrate 320.

Horizontal alignment films (not shown) are provided (i) on an interface between the TFT substrate 310 and the liquid crystal layer 330 and (ii) on an interface between the counter substrate 320 and the liquid crystal layer 330, respectively. This causes liquid crystal molecules constituting the liquid crystal layer 330 to be maintained in splay alignment. A pixel electrode 316 is provided on a surface of the TFT substrate 310, which side faces the liquid crystal layer 330, and a counter electrode (not shown) is provided on a side of the counter substrate 320, which side faces the liquid crystal layer 330. While a potential difference is being applied between the pixel electrode 316 and the counter electrode, the alignment of the liquid crystal molecules constituting the liquid crystal layer 130 is changed into bend alignment.

The TFT substrate 310 includes: a glass substrate 311; a common electrode 312 (a first electrode) functioning as an auxiliary capacitance electrode (a Cs electrode), provided on the glass substrate 311; a drain electrode 314 (a second electrode) having an opening 314a, provided so as to face, via an insulating layer 313, a side of the common electrode 312 which side faces the liquid crystal layer 330; and a planarizing layer 315 provided on the insulating layer 313 so as to surround the opening 314a of the drain electrode 314. The aforementioned pixel electrode 316 is provided on the planarizing layer 315.

As has been already described, the drain electrode 314 has the opening 314a for causing an electric field generated between the common electrode 312 and the drain electrode 314 to be supplied into the liquid crystal layer 330. Further, the planarizing layer 315 also has an opening 315a via which the opening 314a of the drain electrode 314 is exposed to the liquid crystal layer 330. Accordingly, the pixel electrode 316 is arranged to reach the drain electrode 314 along a sloping sidewall of the opening 315a of the planarizing layer 315. With the arrangement, an electric field generated between the common electrode 312 and the drain electrode 314 is supplied into the liquid crystal layer 330 from the opening 314a. This forms, in the opening 315a of the planarizing 315, a transition nucleus constituted by liquid crystal molecules that have been changed into the bend alignment.

Figure 10:
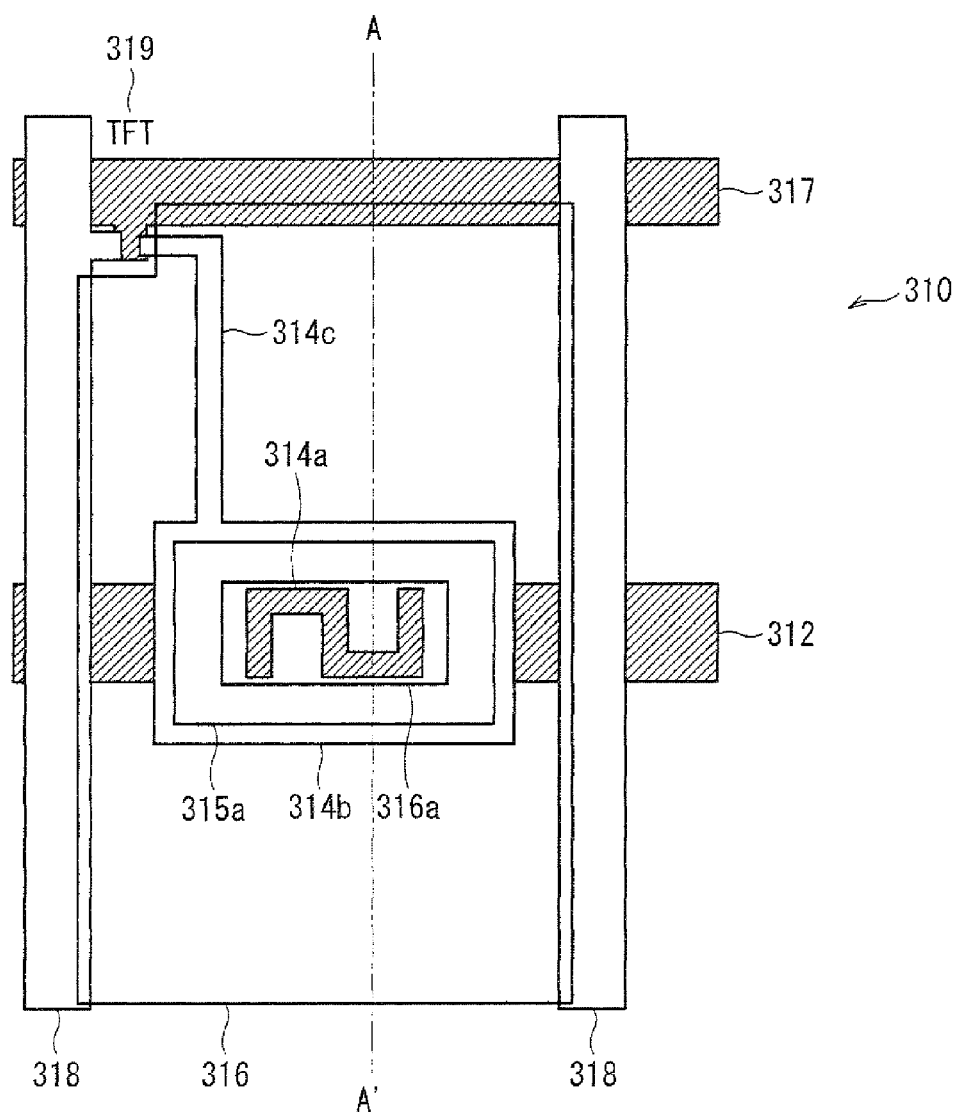
FIG. 10

FIG. 10 is a top view of the TFT substrate 310 of the liquid crystal display device 300, schematically illustrating an arrangement of essential part of the TFT substrate 310. The cross-sectional view illustrated in FIG. 9 is taken along line A-A' in the top view of FIG. 10.

The TFT substrate 310 includes, as has been already described: the glass substrate 311 (not shown); the common electrode 312; the insulating layer 313 (not shown); the planarizing layer 315 (not shown); and the pixel electrode 316. In addition, the TFT substrate 310 further includes: a gate bus line 317; a data bus line 318; and a TFT (Thin Film Transistor) 319 (not shown), as illustrated in FIG. 10.

The gate bus line 317 and the data bus line 318 are provided on the glass substrate 311 so as to be perpendicular to each other. The TFT 319 is provided at an intersection of the gate bus line 317 and the data bus line 318. A gate electrode is connected to the gate bus line 317 and a source electrode is connected to the data bus line 318.

The common electrode 312 is provided in the same layer as the gate bus line 117 (see FIG. 9) such that the common electrode 312 is parallel to the gate bus line 317 and cuts across a center of the pixel electrode 316. Each of the gate bus line 317, the data bus line 318, and the common electrode 312 is connected to a driving circuit so that an arbitrary potential from an external section can be independently applied to each of them.

The drain electrode 314 extends from the TFT 319 provided in a corner of a pixel region comparted by the gate bus line 317 and the data bus line 318, to a center of the pixel region. A rectangular end part 314b of the drain electrode 314 is arranged to face the common electrode 312. Further, an extending part 314c of the drain electrode 314 for connecting the TFT 319 to the end part 314b is formed in a thin line shape.

In the liquid crystal display device 300 illustrated in FIGS. 9 and 10, it should be noted that a width of the end part 314b of the drain electrode 314 is expanded so that the end part 314b covers over the opening 315a of the planarizing layer 315. Here, as mentioned above, light leakage is caused because the liquid crystal layer in the opening 315a has retardation different from that in the normal region and therefore the retardation in the opening 315a cannot be compensated by the optical compensation film during a black display. However, with this arrangement, it is possible to prevent that light emitted from underneath the TFT substrate 310, i.e., from a backlight as a light source, enters the opening 315a of the planarizing layer 315, thereby resulting in that such light leakage from the opening 315a can be prevented during the black display. In other word, there occurs no problem of a decrease in contrast due to an increase in black luminance.

In a case where the opening 315a of the planarizing layer 315 is formed in a bowl shape, as illustrated in FIG. 9, that is, a cut surface of the opening 315a has a shape gradually becoming large from a bottom of the opening 315a toward a side of the opening 315a which side faces the liquid crystal layer 330, it is preferable that the end part 314b of the drain electrode 314 be formed larger than the largest part in the cut surface of the opening 315a, i.e., that part in the cut surface in the opening 315a which is closest to the liquid crystal layer 330. This utterly blocks the backlight incident on the opening 315a of the planarizing layer 315, thereby more surely preventing the light leakage.

MODIFIED EXAMPLE 1

In the liquid crystal display device 300, the opening 314a of the drain electrode 314 is provided in a region that is not covered with the pixel electrode 316 (see FIG. 10). However, the liquid crystal display device 300 is not limited to this. That is, the opening 314a of the drain electrode 314 may be extended to a region covered with the pixel electrode 316. In this case, it is preferable that the opening 316a of the pixel electrode 316 be also extended in conformity with the extending of the opening 314a.

Figure 11:
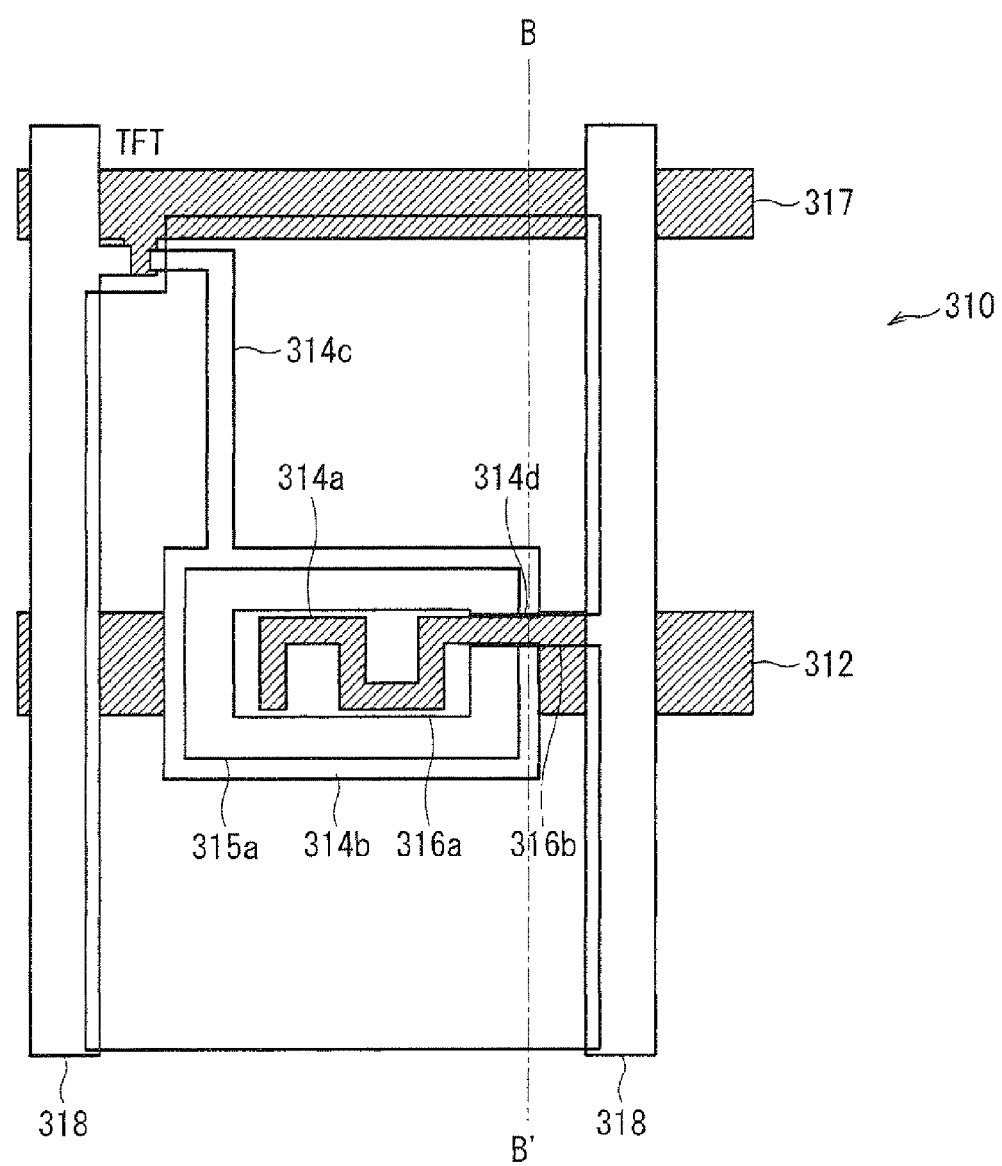
FIG. 11
Figure 12:
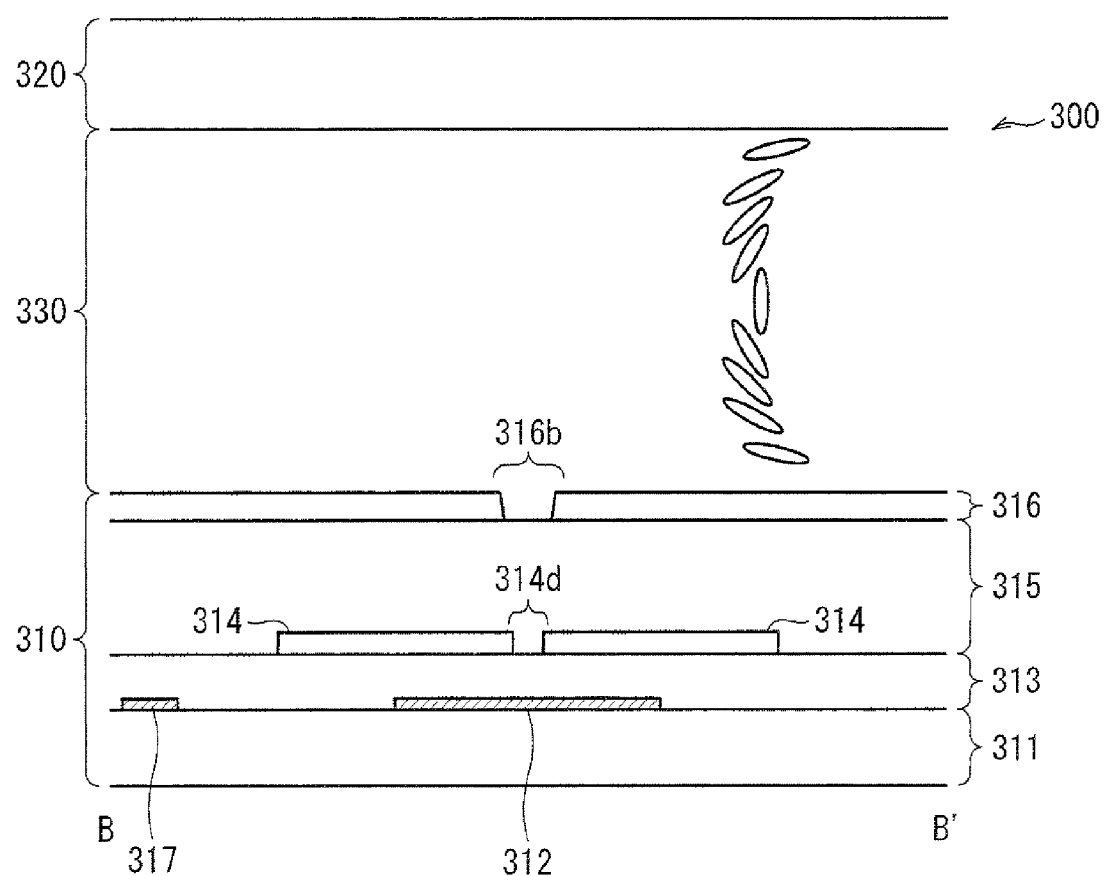
FIG. 12

FIG. 11 is a plane view illustrating a TFT substrate 310 of a liquid crystal display device 300 in which an opening 314a of a drain electrode 314 is extended to a region covered with a pixel electrode 316. Further, FIG. 12 is a cross-sectional view taken along line B-B' in the liquid crystal display device 300 of FIG. 11.

As illustrated in FIG. 11, an end part 314b of the drain electrode 314 has a slit 314d that is continued to the opening 314a, and the pixel electrode 316 has a slit 316b that is continued to an opening 316a. The slit 314d of the drain electrode 314 and the slit 316b of the pixel electrode 316 have the substantially same slit width and are provided so as to overlap each other, as illustrated in FIGS. 11 and 12. This arrangement causes an electric field supplied from the slit 314d of the drain electrode 314 to reach a liquid crystal layer 330 via the slit 316b of the pixel electrode 316. This allows forming of a transition nucleus not only by the electric field supplied from the opening 314a, but also by the electric field supplied from the slit 316b of the pixel electrode 316. As a result, a larger transition nucleus can be formed, thereby more surely carrying out a splay-to-bend transition.

MODIFIED EXAMPLE 2

The liquid crystal display device 300 is such that light incident on the opening 315a of the planarizing layer 315 is blocked by the drain electrode 314 (see FIG. 9). However, the liquid crystal display device 300 is not limited to this.

Specifically, a width of the common electrode 312 may be expanded so that the common electrode 312 covers over the opening 315a of the planarizing layer 315, thereby blocking backlight incident on the opening 315a of the planarizing layer 315 by the common electrode 312.

Figure 13:
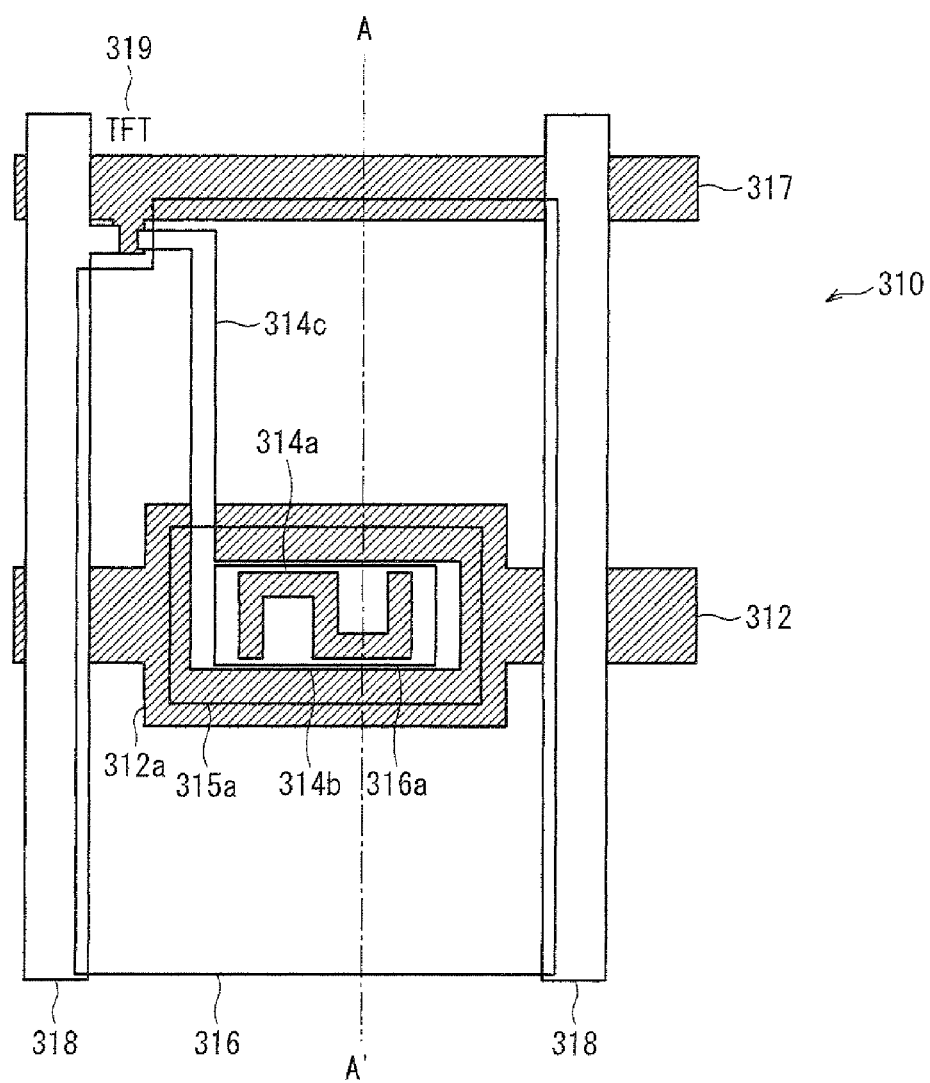
FIG. 13
Figure 14:
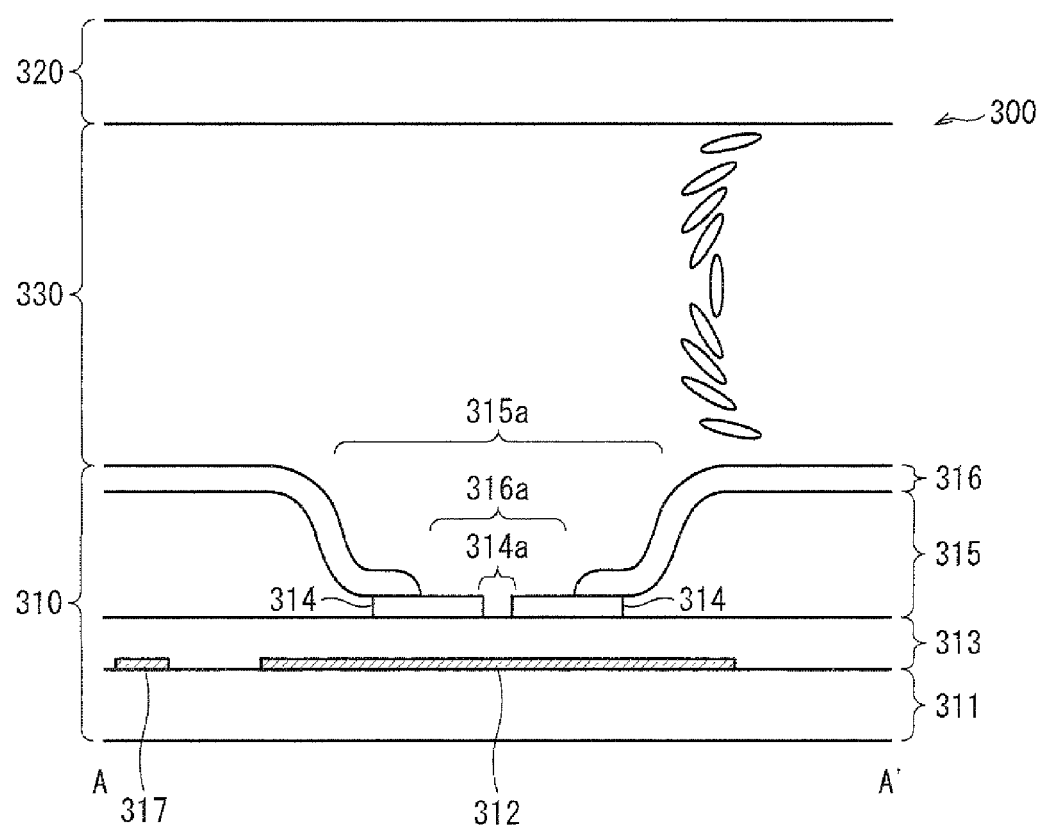
FIG. 14

FIG. 13 is a plane view illustrating a TFT substrate 310 of a liquid crystal display device 300 in which a width of a common electrode 312 is expanded so that the common electrode 312 covers over an opening 315a of a planarizing layer 315. Further, FIG. 14 is a cross-sectional view taken along line A-A' in the liquid crystal display device 300 of FIG. 13.

As illustrated in FIG. 13, a width of a middle part 312a of the common electrode 312 is expanded so as to be larger than the largest part in a cut surface of the opening 315a of the planarizing layer 315 so that the middle part 312a of the common electrode 312 blocks backlight incident on the opening 315a of the planarizing layer 315. In the present embodiment, the common electrode 312 is provided such that only the middle part 312a is formed wide in order that the aperture ratio becomes as high as possible. However, even when a whole of the common electrode 312 is formed wide, the intended object is also attainable.

MODIFIED EXAMPLE 3

The above description dealt with (a) the arrangement in which a width of the end part 314b of the drain electrode 314 is expanded (see FIGS. 9 and 10) and (b) the arrangement in which a width of the middle part 312a of the common electrode 312 is expanded (see FIGS. 12 and 13), each as an arrangement for blocking backlight incident on the opening 315a of the planarizing layer 315. However, the liquid crystal display device 300 is not limited to these. The liquid crystal display device 300 may be arranged such that widths of the end part 314b of the drain electrode 314 and the middle part 312a of the common electrode 312 are expanded so that the end part 314b and the middle part 312a cover over the opening 315a of the planarizing layer 315.

Figure 15:
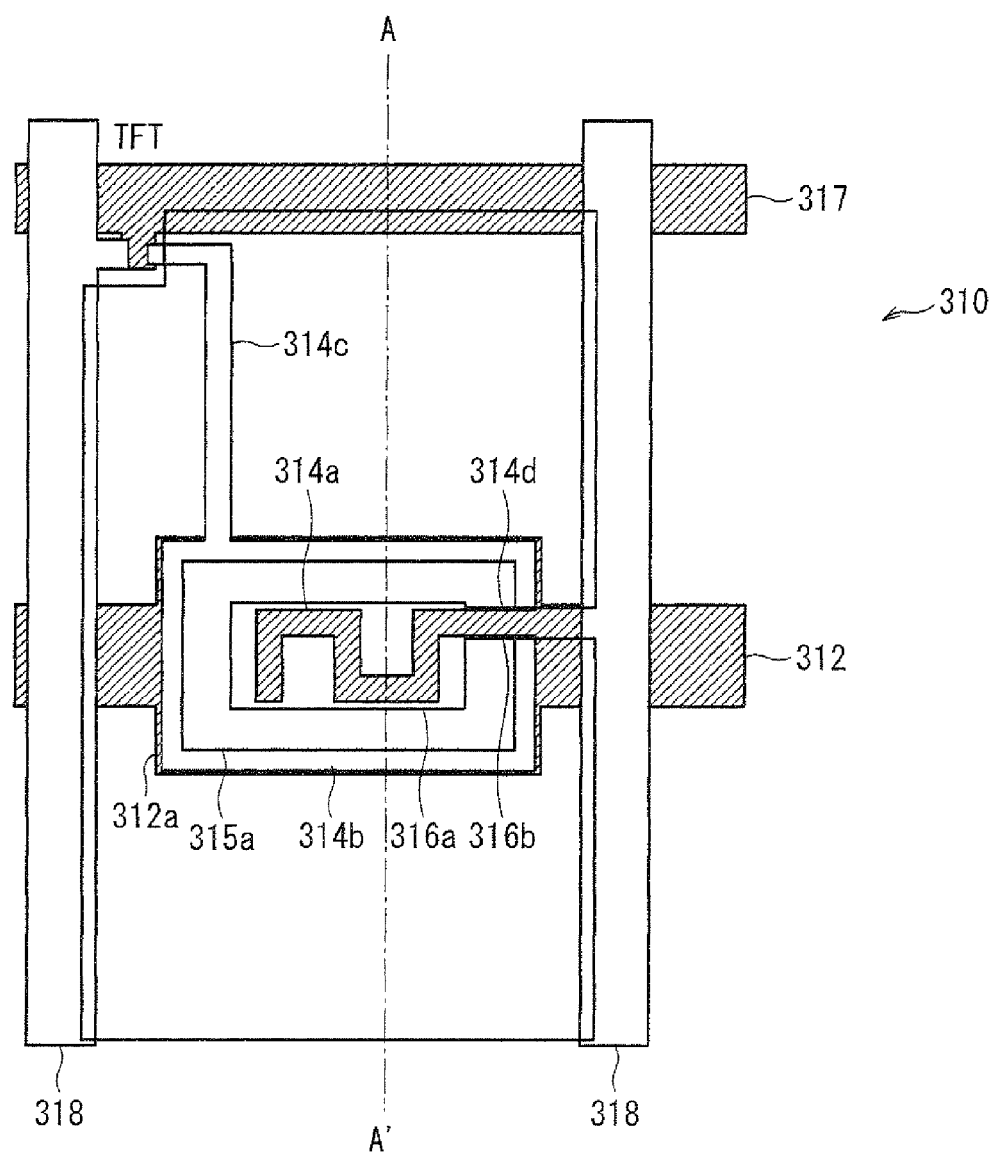
FIG. 15
Figure 16:
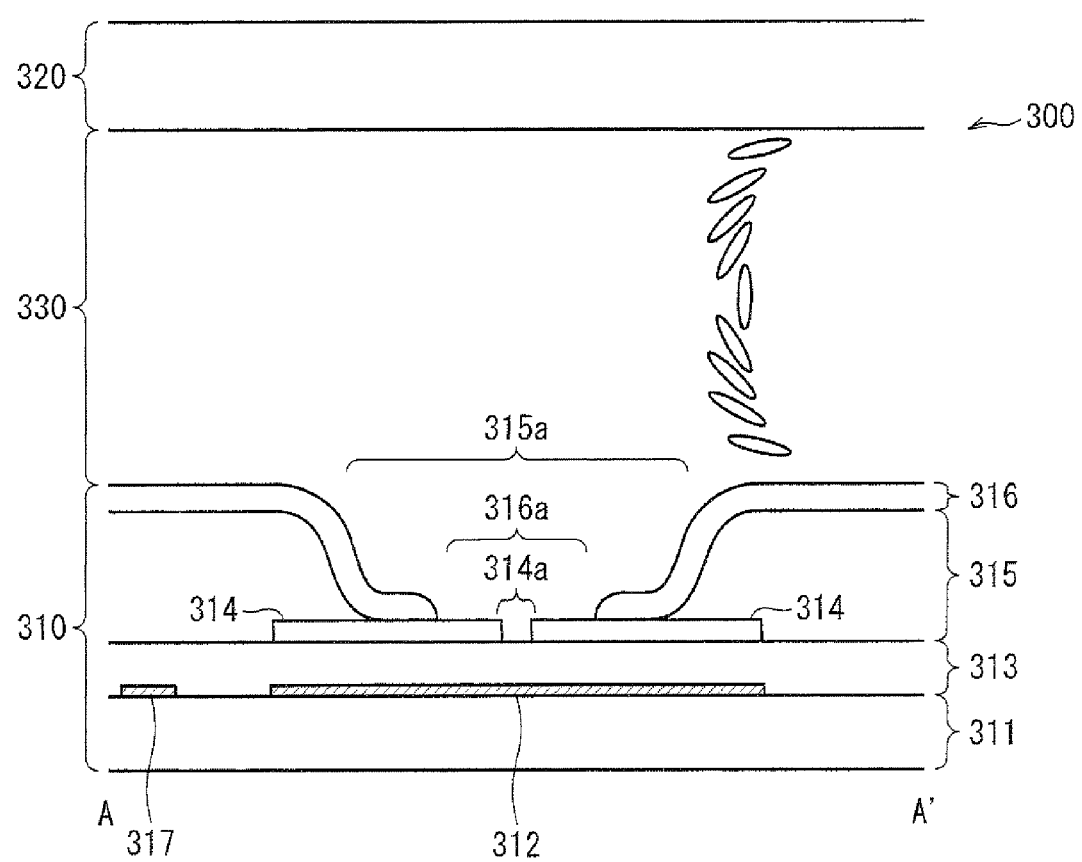
FIG. 16
Figure 17:
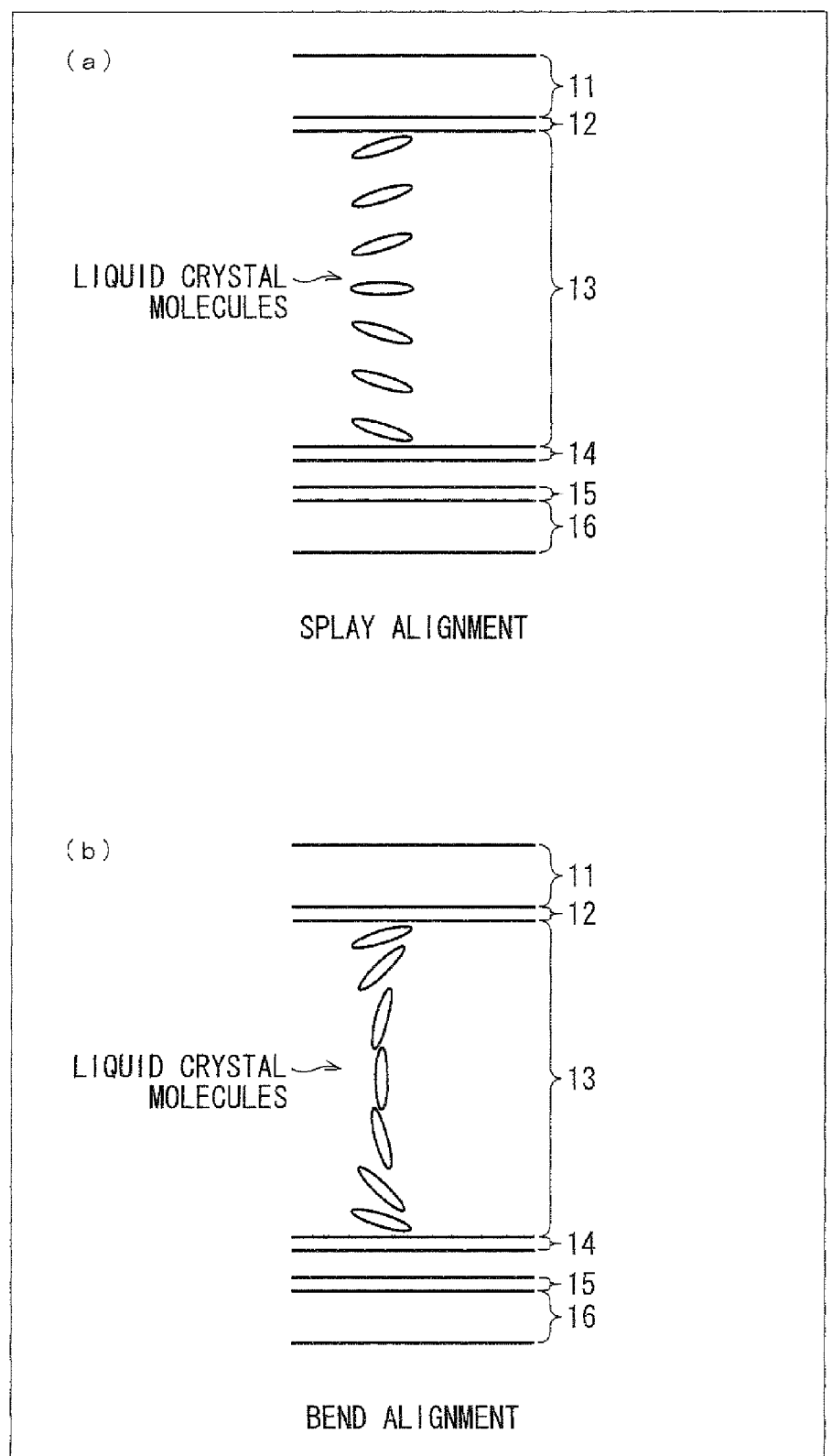
FIG. 17

FIG. 15 is a plane view illustrating a TFT substrate 310 of a liquid crystal display device 300 in which widths of an end part 314b of a drain electrode 314 and a middle part 312a of a common electrode 312 are expanded so that the end part 314b and the middle part 312a cover over an opening 315a of a planarizing layer 315. Further, FIG. 16 is a cross-sectional view taken along line A-A' in the liquid crystal display device 300 of FIG. 15.

In a case where an electrostatic capacitance of pixels is small, a voltage cannot be maintained when a resistance of liquid crystals is low, or the like. This causes, in some cases, a decrease in display quality, e.g., a predetermined display cannot be displayed, luminance becomes partially different, or the like. In contrast, in the liquid crystal display device 300 illustrated in FIGS. 15 and 16, the end part 314b of the drain electrode 314 and the middle part 312a of the common electrode 312, which face each other, are formed so as to have large areas, respectively. This increases an auxiliary capacitance generated between the electrodes, with the result in that the aforementioned decrease in display quality can be prevented.

Additional Matters

The present invention is not limited to the description of the embodiments above, but may be altered by a skilled person within the scope of the claims. An embodiment based on a proper combination of technical means disclosed in different embodiments is encompassed in the technical scope of the present invention.

A liquid crystal display device of the present invention, for example, includes: first and second substrates provided so as to face each other, between which a liquid crystal is injected and sealed, the liquid crystal being splay aligned while no voltage is being applied, but necessary to be changed into bend alignment while a display is being carried out; a gate bus line provided on the first substrate; a data bus line provided so as to be substantially perpendicular to the gate bus line; a TFT connected to the gate bus line and the data bus line; a transparent pixel electrode provided in a pixel region comparted by the gate bus line and the data bus line; and a common electrode provided so as to be substantially parallel to the gate bus line. The liquid crystal display device may be arranged such that a drain electrode of the TFT is extended to an intermediate electrode and the drain electrode has a slit at an overlapping part of the intermediate electrode and the drain electrode.

The liquid crystal display device of the present invention may be arranged such that the pixel electrode is connected to the drain electrode at the overlapping part of the intermediate electrode and the drain electrode.

The liquid crystal display device of the present invention may be arranged such that the pixel electrode has a slit at an overlapping part of the pixel electrode and the intermediate electrode, the slit being continued to the slit of the drain electrode.

The liquid crystal display device of the present invention may be arranged such that the pixel electrode overlaps the data bus line.

Moreover, a liquid crystal display device of the present invention, for example, includes: first and second substrates provided so as to face each other, between which a liquid crystal is injected and sealed, the liquid crystal being splay aligned while no voltage is being applied, but necessary to be changed into bend alignment while a display is being carried out; a gate bus line provided on the first substrate; a data bus line provided so as to substantially perpendicular to the gate bus line; a TFT connected to the gate bus line and the data bus line; a transparent pixel electrode provided in a pixel region comparted by the gate bus line and the data bus line; a common electrode provided so as to be substantially parallel to the gate bus line; and a planarizing layer provided between the data bus line and the pixel electrode. The liquid crystal display device may be arranged such that a drain electrode of the TFT is extended to an intermediate electrode, and the planarizing layer has a hole whose area is placed within an area of the extended drain electrode.

The liquid crystal display device of the present invention may be arranged such that (i) the drain electrode of the TFT is extended to the intermediate electrode, (ii) the drain electrode has a slit at an overlapping part of the drain electrode and the intermediate electrode, and (iii) the drain electrode has a slit continued to the slit of the drain electrode.

Furthermore, a liquid crystal display device of the present invention, for example, includes: first and second substrates provided so as to face each other, between which a liquid crystal is injected and sealed, the liquid crystal being splay aligned while no voltage is being applied, but necessary to be changed into bend alignment while a display is being carried out; a gate bus line provided on the first substrate; a data bus line provided so as to be substantially perpendicular to the gate bus line; a TFT connected to the gate bus line and the data bus line; a transparent pixel electrode provided in a pixel region comparted by the gate bus line and the data bus line; an extended common electrode provided so as to be substantially parallel to the gate bus line; and a planarizing layer provided between the gate bus line and the pixel electrode. The liquid crystal display device may be arranged such that the planarizing layer has a hole whose area is placed within an area of the extended common electrode.

The liquid crystal display device of the present invention may be arranged such that the common electrode and the drain electrode have the substantially identical outline around the hole of the planarizing layer.

In the present invention, an opening for causing an electric field to be supplied into a liquid crystal layer is provided in a second electrode made from metal. This allows easy microfabrication of the opening for causing an electric field to be supplied into a liquid crystal layer. As a result, it is possible to easily realize a liquid crystal display device in which an intensity of the electric field supplied into the liquid crystal layer is more increased than in a conventional liquid crystal display device, and which can more surely control the splay-to-bend transition than a conventional liquid crystal display device. Further, it is possible to easily realize a liquid crystal display device which attains a high aperture ratio with a small nucleus-forming region in which backlight should be blocked.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

Industrial Applicability

The present invention is applicable to a liquid crystal display device to which an OCB (Optically self-Compensated Birefringence) mode is applied and a substrate for a liquid crystal display device to which an OCB (Optically self-Compensated Birefringence) mode is applied. It does not matter whether the liquid crystal display device is a transmissive type, a semi-transmissive type, a reflective type, or a transflective type. A purpose of the liquid crystal display device is not especially limited, but the liquid crystal display device is preferably applicable to an in-vehicle liquid crystal display device, a liquid crystal display device for a mobile device, a liquid crystal display device for a television, and the like liquid crystal display device.

The invention claimed is:

1. A liquid crystal display device comprising:
a first substrate;
a second substrate provided so as to face the first substrate via a liquid crystal layer, the liquid crystal layer being constituted by liquid crystal molecules that are in splay alignment and are changed from the splay alignment into bend alignment by an electric field generated between the first and second substrates,
the first substrate including a first electrode and a second electrode having an opening, the second electrode being provided so as to face the first electrode via an insulating layer, and the second electrode being made from metal;
wherein the first substrate includes a pixel electrode on its surface that faces the liquid crystal layer,
the pixel electrode has an opening in a region covering the opening of the second electrode, and
an edge of the pixel electrode, surrounding the opening of the pixel electrode, is connected to the second electrode.

2. The liquid crystal display device as set forth in claim 1, wherein: the second electrode is an end part of a drain electrode of a thin film transistor via which drain electrode a voltage is applied to the pixel electrode, the end part being provided so as to extend above the first electrode.

3. The liquid crystal display device as set forth in claim 1, wherein: the first electrode is a common electrode provided to cut across the pixel electrode.

4. The liquid crystal display device as set forth in claim 1, wherein: the second electrode has a slit in a region covered with the pixel electrode, and the pixel electrode has a slit in a region covering the slit of the second electrode.

5. The liquid crystal display device as set forth in claim 1, wherein:
the first substrate further includes a planarizing layer having an opening provided in a region covering the opening of the second electrode, and
the pixel electrode is provided on the planarizing layer.

6. The liquid crystal display device as set forth in claim 5, wherein: a width of the pixel electrode is expanded so that the pixel electrode and a data bus line provided on the first substrate overlap each other.

7. The liquid crystal display device as set forth in claim 5, wherein: a width of at least one of the first and second electrodes is expanded so that the at least one of the first and second electrodes covers over the opening of the planarizing layer.

8. The liquid crystal display device as set forth in claim 7, wherein: widths of the first and second electrodes are expanded so that the first and second electrodes cover over the opening of the planarizing layer.

9. A substrate for use in a liquid crystal display device in which liquid crystal molecules that constitute a liquid crystal layer and are in splay alignment are changed from the splay alignment into bend alignment, said substrate comprising:
   a first electrode; and
   a second electrode having an opening, the second electrode being provided so as to face the first electrode via an insulating layer, and the second electrode being made from metal;

wherein the substrate includes a pixel electrode on its surface that faces the liquid crystal layer, the pixel electrode has an opening in a region covering the opening of the second electrode, and an edge of the pixel electrode, surrounding the opening of the pixel electrode, is connected to the second electrode.

* * * * *